United States Patent [19]

Carley

[11] 4,429,402
[45] Jan. 31, 1984

[54] DEVICES FOR USE IN A GLASS-MELTING FURNACE

[75] Inventor: Harold J. Carley, Corning, N.Y.

[73] Assignee: Corning Glass Works, Corning, N.Y.

[21] Appl. No.: 317,995

[22] Filed: Nov. 4, 1981

[51] Int. Cl.³ ............................................. C03B 5/027
[52] U.S. Cl. ................................................... 373/37
[58] Field of Search ..................... 337/27, 29, 30, 36, 337/37, 38, 39, 41, 134

[56] References Cited

U.S. PATENT DOCUMENTS 2,277,678  3/1942  Borel ..................................... 373/36
2,798,892  7/1957  Penberthy ............................. 373/38
3,983,309  9/1976  Faulkner et al. ...................... 373/36

*Primary Examiner*—Roy N. Envall, Jr.
*Attorney, Agent, or Firm*—B. R. Turner; J. P. DeLuca

[57] ABSTRACT

Glass-melting electrodes and other devices may be protected from degradation by oxygen above an oxidation temperature thereof by immersion into the glass. After a sufficient time has elapsed for the glass to adhere to the electrode or device, it is withdrawn to a selected operating depth. The adhered glass becomes partially solidified and forms a protective shield along the electrode. Other precoating measures are described.

34 Claims, 4 Drawing Figures

DEVICES FOR USE IN A GLASS-MELTING FURNACE

BACKGROUND OF THE INVENTION

This invention relates to protection of oxidizable materials or devices used in glass-melting furnaces. More particularly, the invention relates to an oxidizable molybdenum (moly) electrode inserted through the batch of a vertical glass-melting furnace. Other devices and applications are also disclosed.

In a conventional electric glass-melting furnace, electrodes are coupled to a source of electrical power and placed in contact with a bath of molten glass. Electrical energy flows between the electrodes and dissipates energy in the form of Joule heating in the molten glass for melting glass-forming batch materials deposited on and floating atop the bath. Such electrodes may be inserted through openings in wall portions of the furnace, or may be directly placed in contact with the molten glass from above or through the layer of batch floating thereon as in the case of cold crown electrical melters.

In many conventional glass-melting furnaces moly is used as the electrode material. However, because moly has a relatively low oxidation temperature of about 500° C., complex protection devices are required to shield the electrodes from deterioration by contact with ambient oxygen or oxygen trapped in the glass-forming batch materials and/or other corrosive agents thereon. Such devices include water-cooled stainless steel sleeves and/or specially fabricated glass contact refractory sleeves which surround the electrode. These devices are expensive and somewhat short lived. Further, water cooling tends to dissipate energy intended for glass-melting purposes and has a deleterious effect on melting energy efficiency. Conventional protection devices tend to be heavy and cumbersome and are not easily adjusted or replaced, thereby diminishing their versatility. Glass quality may also be affected by contamination of the glass by materials forming the protective devices which materials eventually corrode and become mixed with the glass in the furnace.

The present invention utilizes a relatively inexpensive and long-lived system for directly immersing moly rods into a bath of thermoplastic material. The moly rods are protected from oxidation without complicated peripheral apparatus. The system may be operated without cooling, and thus, energy utilization is enhanced. Further, the moly rods are supported in a relatively simple holder thereby facilitating adjustment and replacement.

It should be realized that the present invention is also applicable to other devices which may be directly immersed in a bath of molten glass as, for example, stirring devices, oxygen sensors and thermocouples. Also other oxidizable materials are contemplated (e.g. tungsten, rhenium, columbium, etc.), as long as the oxidizable portions thereof are protected in the manner set forth herein. However, in order to simplify the disclosure herein, reference will mainly be made to the advantages of the present invention relative to moly electrodes. It is intended, however, that such other alternatives are to be considered part of the invention.

SUMMARY OF THE INVENTION

A method is set forth for protecting or shielding devices, susceptible to deterioration above an oxidation temperature, for insertion within a bath of molten glass. The method includes the steps of dipping the device into the bath of molten glass along a selected axial length thereof to a dipping level, allowing the molten glass to adhere to the device over said selected length and withdrawing the device and adhered molten glass from the bath at least to a selected operating level above the lower immersion level, such that portions of the electrode experiencing temperatures in excess of the oxidation temperature thereof are coated with a layer of highly viscous, partially solidified glass.

In one form of the invention the device may be an oxidizable molybdenum electrode with an adhered layer of glass covering it in vulnerable locations. In another embodiment of the present invention, a molybdenum rod may be pre-coated with one or more axially located coatings of different glasses, each having characteristics suitable for the temperature range at which the coating is to be operated. The present invention may be utilized in connection with the operation of thermocouples, glass stirring devices, and other apparatus in need of protection from oxidation at relatively high temperatures.

In a series of related U.S. patent applications Ser. Nos. 317,994 and 317,996 filed this same date and Ser. No. 243,811 filed Mar. 16, 1981, now U.S. Pat. No. 4,366,571, issued Dec. 18, 1982, all of which are assigned to the assignee herein, other embodiments and examples are described. The teachings of such applications are considered to be incorporated herein by reference.

DESCRIPTION OF THE PREFERRED EMBODIMENTS

Figure 1:
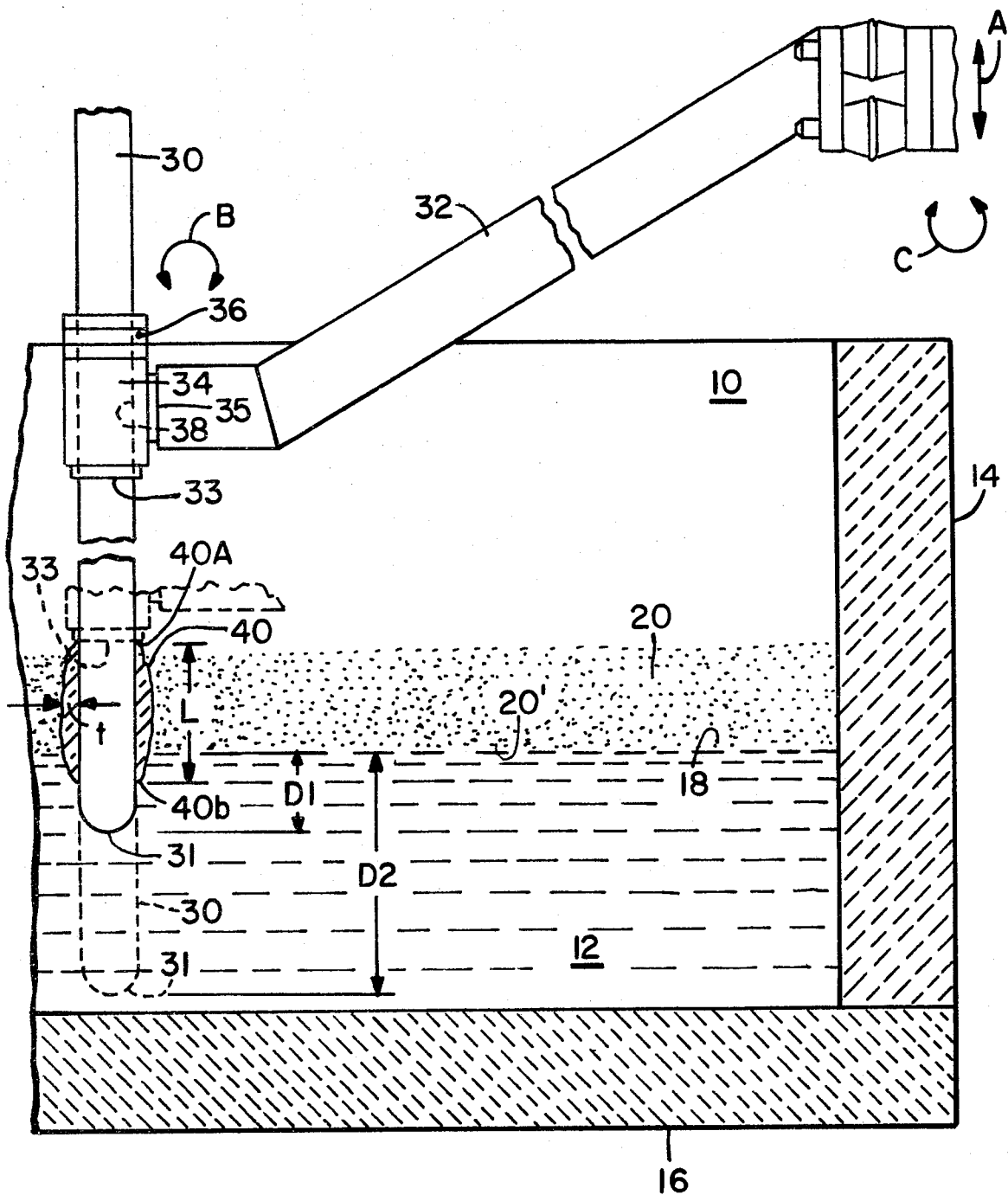
FIG. 1 is a fragmented schematic side sectional illustration of an electrode (including a phantom view thereof) immersed in a glass-melting furnace being operated in accordance with the principles of the present invention.

FIG. 1 shows an embodiment to the present invention wherein a vertical electric glass-melting furnace 10 is illustrated in fragmented side section. The furnace 10 contains a bath of molten thermoplastic material such as glass 12. The furnace 10 includes an upstanding side wall 14 and a bottom wall 16. The bath of molten glass 12 has an upper free surface 18 upon which there is deposited a quantity of glass-forming batch materials or batch 20. The batch 20 is in the form of a floating blanket which insulates the free surface 18 of the bath 12 and retains heat within the furnace 10. The molten glass 12 is initially melted by conventional means including a gas burner not shown. Thereafter, continuous melting takes place by means of a plurality of current-carrying electrodes 30 inserted into the bath 12. Only one electrode 30 is shown in order to simplify the drawing.

Each electrode 30 may be carried in a collar 34 secured to a support arm structure 32. The collar 34 has an adjustment ring structure 36 for allowing the electrode 30 to slide up and down within a through opening 38 in said collar 34. The support arm 32 is shown fragmented and is suitably supported exterior of the furnace 10 by a frame structure (not shown) which allows the support arm 32 to move upwardly and downwardly in the direction of the double headed arrow A in FIG 1. Support arm 32 may be joined to collar 34 by sleeve 35 which allows individual placement of electrode 30 (see curved double headed arrow B). Also, support arm may be moved circumferentially about its frame structure by means not shown (in the direction into and out of the page as illustrated by double headed arrow C.)

Although other aspects and embodiments are described herein, the present invention is primarily concerned with protecting the electrode from its tip 31 to a point therealong at 33 just below the collar 34. The electrode 30 is normally immersed so that its tip end 31 extends into the bath 12 to a depth D1, referred to as the operating level, as measured from the free surface 18. In the phantom drawing, superimposed on the solid line drawing in FIG. 1, electrode 30 is shown with its tip 31 immersed to a second or dipping level D2 as measured from the free surface 18 of the bath of glass 12.

The invention operates as follows: a portion of the electrode 30 from the tip 31 to near the point 33 is submerged or dipped into the bath 12. The electrode is held submerged with its tip 31 at the depth D2 for several minutes until it becomes heated sufficiently, such that, the glass 23 becomes adhered to the electrode 30 at least along a portion thereof submerged below the free surface 18 (i.e. from tip 31 to near point 33). After sufficient time has elapsed for the molten glass 12 to adhere to the electrode 30, it is partially withdrawn from the furnace 10 up to the operating level D1. Adhered glass shown at reference numeral 40 forms a coating 40 having respective upper and lower edges 40A-40B. The coating 40 covers or coats a selected length L of the electrode 30 as a relatively thin film of thickness t thereby blocking oxygen infiltration and protecting the electrode from deleterious oxidation. The thickness t of the coating 40 is dependent upon the temperature and viscosity characteristics of the glass 12. The adhered glass coating 40 becomes partially solidified or highly viscous due to the fact that the temperature of the electrode 30 drops to near a solidification temperature thereof as one moves away from the tip 31. Also, the batch 20 surrounding the electrode 30 is relatively cool and insulates the coating 40 from the high heat of furnace 10.

The depth at which the electrode 30 is operated may vary about the depth of D1, but for purposes of illustration herein, the operating level D1 of the electrode 30 remains substantially constant once it is determined. External cooling of the electrode 30 is not generally necessary since portions thereof above upper edge 40A which are exposed to ambient oxygen are cooled by natural convection to below the oxidation temperature of the moly. Portions of the electrode 30 below a lower edge 40B of the coating 40 are protected from oxidation by immersion in the molten glass 12.

The present invention has most significant applications for batch electrodes or electrodes which penetrate a batch blanket in cold crown vertical melters. In principle, however, there is no reason why such an electrode could not be utilized wherever electrodes are presently used in furnaces (e.g. through the side walls 14 or bottom wall 16) as long as some form of protection is provided to prevent furnace leaks.

The present invention affords considerable savings over conventional protective devices. Further, since conventional devices are typically water cooled, there are significant energy savings available resulting in higher melting efficiencies.

For certain glasses the tip 31 of the electrode 30 should be placed as close as possible to an underside 20' of the batch 20 near free surface 18. For other glasses more efficient melting takes place when the tip 31 of the electrode 30 is placed further down in the molten glass 12. It can be readily appreciated that these adjustments are more easily accomplished by utilization of a bare rod concept herein described. Since the electrode structure formed of a cylindrical moly rod is significantly lighter without the stainless steel water-cooled jacket of the prior conventional furnaces, adjustment of operating level D1 of the electrode 30 is uncomplicated. Thus, more efficient melting can be achieved because the location of the tip end 31 of the electrode 30 can be fine tuned to best suit melting characteristics of the particular glass being melted. The operating level D1 of the electrode 30 may be changed by simply moving the support arm 32 upwardly and/or downwardly from exterior the furnace 10 or by moving the electrode in support collar 34. Further, the electrode 30 may be reciprocated between levels D1 and D2 to periodically replenish the coating 40.

The outer surface of the electrode 30 may be treated prior to immersion in the bath 12 in order to protect the moly and to allow for more adequate adhesion of the glass layer 40 to the electrode 30. A refractory substance such as a flame sprayed aluminum oxide sold under the trademark ROKIDE appears to reduce oxygen contamination and has a beneficial effect on adhesion of the glass layer 40 to the electrode 30. A coating of chromium oxide over the surface of electrode 30 may also enhance adhesion of the glass coating 40. It has been found that slight oxidation of the electrode 30 itself may be helpful to glass adhesion. A coating of molybdenum disilicide may also be used to protect the electrode 30 from oxidation.

Figure 1A:
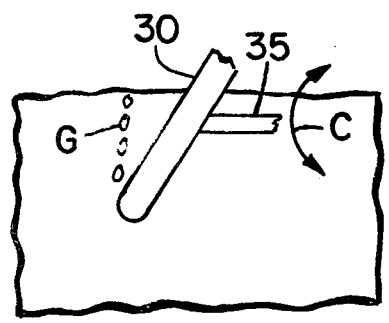
FIG. 1A is a schematic diagram illustrating an inclined electrode.

Sometimes gases are evolved during the glass melting process (see FIG. 1A). If such gases come into contact with the electrode 30, oxidation or corrosion thereof may occur. As a further precaution against oxidation, therefore, the electrode 30 may be inclined about the vertical by means of sleeve connection 35 (see double headed arrow B). Gas bubbles evolved will tend to float vertically upward and away from electrode 30.

Figure 2:
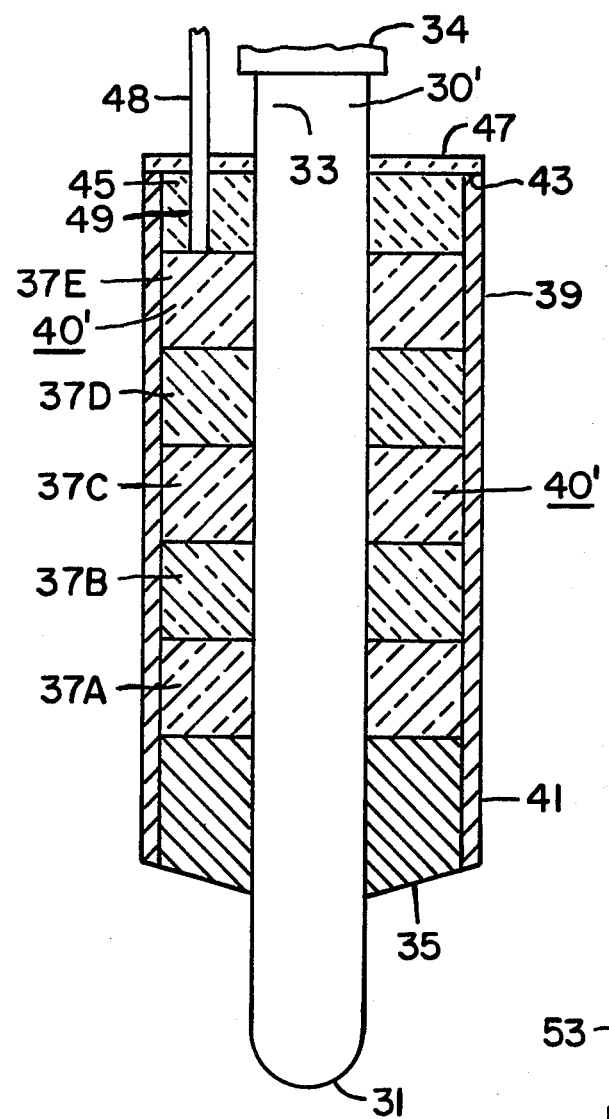
FIG. 2 is a schematic illustration of an alternate embodiment of an electrode constructed in accordance with the principles of the present invention utilizing a graded glass shielding device.

In FIG. 2 there is illustrated an alternative embodiment of the present invention wherein electrode 30' is preshielded with a protective glass coating 40'. The electrode 30' has a moly collar 35 located near the tip end 31. The collar 35 may be threaded, shrink fit or bolted onto the electrode 30'. A plurality of different glass-forming materials, in the form of unconsolidated cullet or solid glass annular rings or annular cylinders 37A-37E, may be located axially of the electrode 30' along a selected length L' to grade the protective coating 40' thereof. If glass cullet is utilized for the rings 37A-37E, an alumina tube 39 of sufficient length may be joined at a lower end 41 to the collar 35 for containing the materials therein. A fused silica material such as sold under the trademark VYCOR could be used for tube 39. At an upper end 43 of the tube 39, an annular refractory cap or plug 45 may be sleeved over the rod 30' and located within the tube 39 to close a space containing the protective coating 40' therein. The plug 45 may be a packing material such as FIBERFRAX ® Rope. Additionally, a readily available extrudable silicone sealant 47 such as Dow Corning RTV 732 could be placed over refractory cap 45. A purge line 48 may be fitted through opening 49 in plug 45 and seal 47 for the introduction of a purge gas P interior the tube 39. A purge gas P protects the moly electrode during startup before the cullet rings 37A-37E melt. Thereafter, the melted material protects electrode from oxygen contamination.

The electrode 30' illustrated in FIG. 2 might be suitably clamped to the support collar 34 and slowly lowered through the batch 20 and into the molten glass 12. At such time, the various layers of protective materials 37A-37E would become melted or softened and adhere to the electrode 30'. It should be realized that, as in the embodiment of FIG. 1, the protective layer 40 experiences a temperature gradient when placed in service. The temperature of the electrode 30' decreases as one moves axially therealong from the tip 31 to the point 33 near where it is supported by collar 34. Different glass compositions may be used for the rings 37A-37E forming protective layer 40', each having a different softening and annealing point. Each will be susceptible to some viscous flow at various temperatures. By tailoring the compositions of rings 37A-37E from relatively hard glasses, for the lowest protective layer 37A near the tip 31, to relatively soft glasses at the upper end of the protective layer 33, each will exhibit the proper characteristics at its anticipated operating temperature. By grading the glasses as hereinabove set forth, there is less likelihood of thermally shocking the protective layer 40' over the temperature gradient therealong. Further, because the batch layer 20 acts as an insulator from the high heat generated within the bath of molten glass 12, the protective coating 40' will remain relatively intact even though it is softened.

The following Example is thought to set forth a suitable embodiment of a graded protective coating 40' beginning with the lower ring 37A or relatively softer glass and progressing to the uppermost ring 37E of relatively harder glass as follows:

37A—Borosilicate (Corning Code 7740) (8" long)

37B—Alkali Barium Borosilicate (Corning Code 7052) (7" long)

37C—Borosilicate having a high boric oxide content as set forth in U.S. Pat. No. 2,106,744

37D-37E—Borosilicate glass as in 37C mixed with increasing amounts of anhydrous boric oxide from 20 to 40% respectively (7" long each)

Rings 37A-37E—100 mesh cullet

Tube 39—VYCOR brand tubing

Total length of coating—approximately 36"

The present invention also contemplates the use of a borosilicate glass tube 39 such as Corning Code 7052 having an expansion comparable with the moly. The tube 39 would be sealed directly to the electrode 30' without the cullet fill 37A-37E. The electrode 30' should be preheated in order to prevent thermal shock.

An advantage of the arrangement illustrated in FIG. 2 is that electrode 30' may be prefabricated for quick insertion into the furnace 10 without any other preparation. The tube 39 not only contains therewithin the protective layer 40' (if in granular form), but also provides for some protection of the protective layer 40' at least until it is consolidated during operation of the furnace 10. The moly collar 35 would normally be located below the level of the free surface 18 of the bath 12 shown in FIG. 1, and thus, is protected from oxidation by its immersion in the molten glass 12.

Figure 3:
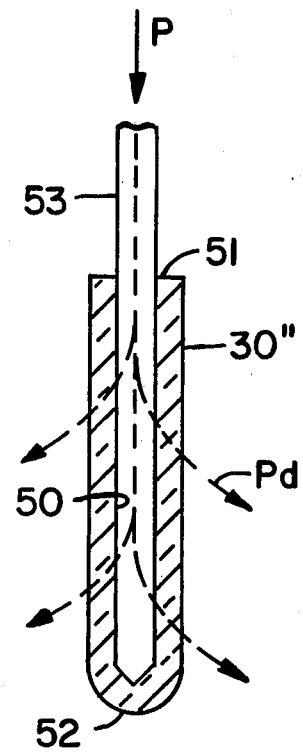
FIG. 3 shows another embodiment of the present invention wherein the electrode has an axial opening into which a purge fluid is introduced.

In FIG. 3 there is illustrated yet another embodiment of the present invention. An electrode 30" may have an axial bore 50 drilled or formed therein. The bore 50 extends generally lengthwise thereof from an open upper end 51 to near tip 52 thereof. A purge line 53 may be located in the open end 51 and a purge fluid P introduced therein. At elevated temperatures, hydrogen or other gases inert with respect to moly will diffuse therethrough as shown by dotted arrow Pd. This embodiment, when dipped, as shown in FIG. 1 or otherwise protected from oxidation as elsewhere set forth herein, is additionally protected from oxidation without undue energy and materials costs.

While there has been described what are considered to be the preferred embodiments of the present invention it will be obvious to those skilled in the art that various changes and modifications may be made therein without departing from the invention, and it is intended in the appended claims to cover all such changes and modifications as fall within the true spirit and scope of the invention.

What is claimed is:

1. A method of protecting or shielding from oxygen an oxidizable device within the glass melting furnace, said furnace containing a supply of molten glass having an upper free surface, and the device being at an elevated temperature above an oxidizing temperature thereof, comprising the steps of:

dipping the device into the molten glass to a selected immersion level along a selected length thereof susceptible to temperatures in excess of the oxidation temperature;

maintaining the device at the immersion level a sufficient time in order to allow the molten glass to adhere to the device to form a coating having upper and lower margins and a selected length;

withdrawing the device and the adhered molten glass coating from the bath at least to a selected operating level above the immersion level such that the device is shielded from oxidizing agents along the selected length;

maintaining an upper margin of the coatings above the upper free surface of the glass; and maintaiing the device in an uncooled condition.

2. A method as set forth in claim 1 further including the step of precoating the device with a relatively thin protective refractory coating prior to immersion into the bath.

3. A method as set forth in claim 1 wherein the device is an electrode and further comprising the step of depositing a batch blanket of fusable glass-forming batch materials atop the bath of molten glass and piercing said batch blanket with said electrode.

4. A method as set forth in claim 1 wherein said adhered molten glass coating is relatively thin and extends along said electrode a selected length between the immersion level and the operating level.

5. A method as set forth in claim 1 further comprising the step of surface coating the electrode with a relatively thin coating of refractory selected from the group consisting essentially of aluminum oxide, chromium oxide, molybdenum disilicide, and molybdenum oxide.

6. A method as set forth in claim 1 wherein the device comprises at least one of an electrode, thermocouple, oxygen sensor and stirrer.

7. A method as set forth in claim 1 further comprising the step of electrically energizing the electrode for conducting electrical currents through the bath of molten glass when the electrode is immersed to at least one of the operating level and the immersion level.

8. A method as set forth in claim 7 wherein evolved gases occur adjacent the energized electrode and further including the step of inclining the electrode relative to a vertical direction in order to minimize contact of the evolved gas and the electrode.

9. A method as set forth in claim 6 further comprising reciprocating the electrode between the operating and immersion levels for replenishing the coating of adhered molten glass.

10. A method as set forth in claim 1 further comprising the step of precoating the device with an annular glass coating at least along the selected length.

11. A method as set forth in claim 1 further comprising the step of diffusing a purge gas through the device from the interior to the exterior thereof.

12. A method of protecting or shielding from oxygen an oxidizable device within a glass melting furnace, the furnace containing the supply of molten glass having an upper free surface, and the device being at elevated temperatures above an oxidizing temperature thereof, comprising the steps of:
precoating the device with an annular protective coating at least along a selected length thereof, the coating having upper and lower margins;
dipping the device into the molten glass to a selected immersion level susceptible to temperatures in excess of the oxidization temperature;
maintaining the device at the immersion level a sufficient time in order to allow the annular protective coating to soften and become viscously adhered to the device;
withdrawing the device from the bath at least to a selected operating level above the immersion level so that the upper margin of the coating is above the free surface of the glass; and
maintaining the device in an uncooled condition.

13. A method as set forth in claim 12 wherein the step of precoating comprises the steps of: selecting at least one vitreous material, surrounding the device therewith along the selected length and supporting said vitreous material relative to the device.

14. A method as set forth in claim 13 wherein selecting the vitreous material comprises the step of choosing a plurality of vitreous materials having different viscosity characteristics from a relatively hard glass to a relatively soft glass and locating said materials about the device in axially located annular bands from the respective relatively hard to soft glasses beginning near a portion of the device exposed to relatively higher temperatures for avoiding thermal shock and spalling of the vitreous materials away from the device.

15. A method as set forth in claim 13 wherein the vitreous material is initially in granular form and the method further comprises the step of containing the granular vitreous material in position about the device until said vitreous material becomes softened and viscously adhered to the device.

16. A method as set forth in claim 15 further comprising the step of sealing the contained granular material against ambient atmosphere.

17. A method as set forth in claim 15 further comprising the step of introducing a purge gas through the granular material adjacent the exterior of the device.

18. A method as set forth in claim 12 wherein the step of precoating comprises selecting at least one vitreous material and sealingly attaching the material about the device along the selected length.

19. A method as set forth in claim 12 further comprising the step of diffusing a purge gas through the device from the interior to the exterior thereof.

20. An oxidizable electrode for a melting furnace containing a supply of glass in a molten state, and a blanket of glass forming batch materials floating on top of an upper free surface of said glass, said electrode capable of operating in excess of an oxidization temperature thereof comprising:
an oxidizable electrically conductive rod of a selected length having a tip end and a support portion extending axially therefrom, said rod being oxidizable in the presence of oxygen at temperatures necessary to melt the glass, said rod being locatable in the furnace and partially submergable in the molten glass from the tip end to at least near the support portion thereof;
a relatively thin coating of vitreous material adhered to a selected portion of the rod between the tip end and the support portion, the rod being located in the glass such that an upper margin of the coating near the support portion is located above the free surface of the glass, said vitreous coating comprising a semi-solidified mass of the supply of glass forming a viscous film about the rod along a length thereof from at least the upper free surface of the glass to at least a portion of the rod thereabove which is as a temperature below the oxidation temperature of the rod and being relatively highly viscous and adherent to the rod along said length at temperatures at least near the oxidation temperature thereof, said rod being maintained in an uncooled condition and said rod being shielded from oxygen by the coating where the temperature of the rod is in excess of the oxidation temperature thereof.

21. An oxidizable electrode for a melting furnace containing a supply of glass in a molten state, and a blanket of glass forming batch materials floating on top of an upper free surface of said glass, said electrode capable of operating in excess of an oxidation temperature thereof comprising:
an oxidizable electrically conductive rod of a selected length having a tip end and a support portion extending axially therefrom, said rod being oxidizable in the presence of oxygen at temperatures necessary to melt the glass, said rod being locatable in the furnace and partially submergable in the molten glass from the tip end to at least near the support portion thereof;
a relatively thin coating of vitreous material adhered to a selected portion of the rod between the tip end and the support portion, the rod being located in the glass such that an upper margin of the coating near the support portion is located above the free surface of the glass, said vitreous coating comprising a plurality of annular formations of vitreous materials surrounding the electrode continuously along a selected length thereof, said vitreous materials being formed of substances having viscosity characteristics successively ranging from a relatively high viscosity near the tip of the rod to a relatively lower viscosity remote from said tip and adherent to the rod at temperatures at least near the oxidation temperature thereof, said rod being maintained in an uncooled condition and said rod being shielded from oxygen by the coating where the temperature of the rod is in excess of the oxidation temperature thereof.

22. An electrode as defined in claim 21 further comprising: a lower support means secured to the electrode near the tip, said support means engaging the high viscosity annular formation for supporting the coating against viscous flow thereof in the direction of the tip.

23. An electrode as defined in claim 22 further comprising an annular containment tube surrounding the electrode coating along the selected length thereof said tube being secured at one end to the support means for preventing flow of the coating away from the electrode.

24. An electrode as defined in claim 23 wherein the annular tube is formed of materials selected from the group consisting primarily of fused silica and alumina.

25. An electrode as defined in claim 23 further comprising an upper cover for said tube for engaging the low viscosity material and closing said containment tube.

26. An electrode as defined in claim 23 wherein the upper cover comprises an annular refractory plug.

27. An electrode as defined in claim 23 wherein the upper seal comprises a relatively soft extrudable silicone sealant compound.

28. An electrode as defined in claim 22 wherein the coating of the annular formation comprises granular vitreous materials surrounding the electrode and contained within said tube and further including a purge gas atmosphere surrounding the device interspersed in said granular material.

29. An electrode as defined in claim 22 wherein the vitreous materials comprise borosilicate glasses wherein increasing amounts of boron compounds are mixed therein in a direction away from said tip in order to produce increasing softness characteristics in said glasses.

30. An electrode as defined in claim 20 further comprising a surface coating of refractory materials adhered to the electrode before the vitreous coating.

31. An electrode as defined in claim 20 wherein the refractory materials are formed of materials selected from the group consisting essentially of aluminum oxide, chromium oxide, molybdenum disilicide, and molybdenum oxide.

32. An electrode as defined in claim 31 wherein the refractory oxides are deposited onto the electrode by flame spray deposition.

33. An electrode as defined in claim 20 wherein the vitreous coating is formed of the supply of glass in the molten state contained within the furnace.

34. An electrode as defined in claim 20 wherein the vitreous coating is formed of a borosilicate glass tube sleeved over said electrode, said tube having a thermal expansion characteristic similar to that of the electrode to thereby reduce effects of thermal shocking when the electrode becomes heated within the furnace.

* * * * *